United States Patent [19]
Kimura

[11] Patent Number: 5,899,482
[45] Date of Patent: May 4, 1999

[54] STEERING MODE SWITCHING CARRIAGE

[75] Inventor: Yukio Kimura, Nagoya, Japan

[73] Assignee: Kimura Unity Co., Ltd., Aichi, Japan

[21] Appl. No.: 08/872,705

[22] Filed: Jun. 11, 1997

[30] Foreign Application Priority Data

Jan. 21, 1997 [JP] Japan ......................................... 9-8894

[51] Int. Cl.$^6$ ................................................... B62D 7/06
[52] U.S. Cl. .......................... 280/445; 280/99; 280/47.11
[58] Field of Search ..................... 280/442, 443, 280/444, 445, 98, 99, 103, 47.34, 47.11

[56] References Cited

U.S. PATENT DOCUMENTS

| | | | |
|---|---|---|---|
| 2,763,493 | 9/1956 | Hutchinson | 280/444 |
| 3,211,467 | 10/1965 | Siddall | 280/445 |
| 3,294,417 | 12/1966 | March | 280/444 |
| 3,620,549 | 11/1971 | Miller et al. | 280/99 |
| 5,704,623 | 1/1998 | Chapman | 280/47.11 |

OTHER PUBLICATIONS

Kikogaku—"Mechanism", *Kyoritusyuppan Kabushikigaisya*, 4 pages (1978–1992).
Catalog of "Industrial Trailer", *Suehiro Industries, Ltd.*, Catalog No. T–4, 4 pages (printed: Sep. 1, 1995).

*Primary Examiner*—Kevin Hurley
*Attorney, Agent, or Firm*—Pearson & Pearson

[57] ABSTRACT

A novel steering mode switching carriage is disclosed. A plurality of such carriages, if coupled to each other, can follow a single path without developing any discrepancy in turning radius between front and rear inner wheels when traveling on a curve. The carriage is used as a conventional cart if the front wheels are made to pivot freely and the rear wheels are fixedly aligned longitudinally. According to the present invention, a pair of pivotal shafts of the front wheels and a pair of pivotal shafts of the rear wheels are coupled by right and left parts of a reversing mechanism respectively. Each pivotal shaft is provided with an engaging member, which has a slider and a link lever extending therefrom. The front wheel is caused to pivot by the slider, and the reversing mechanism and the slider are coupled to each other by the link lever. The right and left link levers are coupled to each other by a synchronizing shaft, which is caused to pivot laterally by a steering lever whose rear end is pivotally supported at a lateral center between the front wheels. A front end of the steering lever is operatively connected to a traction bar, which disengages the engaging members from the pivotal shafts to allow pivotal movement of the front wheels. In this mode, the steering lever is fixed at a central position thereof, thus fixedly aligning the rear wheels longitudinally.

4 Claims, 8 Drawing Sheets

STEERING MODE SWITCHING CARRIAGE

BACKGROUND OF THE INVENTION

1. Field of the Invention

The present invention relates to a carriage for transporting baggage, parts and the like, more specifically, to a steering mode switching carriage, wherein rear and front wheels of the carriage travel on the same path in traction mode, and wherein the rear wheels travel only in the longitudinal direction while the front wheels are pivotable when the carriage is used as a cart.

2. The Related Art

A conventional carriage includes a pair of front wheels each having a pivotal shaft about which the front wheel is pivotable, and a pair of rear wheels unpivotably fixed. When the carriage travels on a curve, therefore, there is always developed a discrepancy in turning radius between the front and rear inner wheels.

An attempt to transport a large amount of parts or the like at a time by coupling a plurality of carriages would increase the discrepancy in turning radius between the respective front and rear inner wheels in proportion to the number of carriages when a train of carriages travel on a curve. As a result, the path necessitates a sufficient width, allowing no more than three carriages to be coupled. In addition, a driver has to make sure that a corner post is not touched by any of the carriages.

SUMMARY OF THE INVENTION

It is thus an object of the present invention is to provide a steering mode switching carriage which is able to travel on a path without developing any discrepancy in turning radius between the front and rear inner wheels thereof when used as a train of carriages, and travel like a conventional carriage with the front wheels pivotable and with the rear wheels unpivotably fixed when used as a cart.

In order to achieve the above-described object, the steering mode switching carriage according to a first aspect of the present invention is constructed as follows. That is, the steering mode switching carriage includes a pair of front wheels, a pair of rear wheels, a steering shaft, a front wheel steering mechanism, a reversing mechanism and a steering mode switching mechanism. Each of the front and rear wheels is provided with a pivotal shaft. A rear end of the steering lever is pivotally supported at a lateral center position between the front wheels. The front wheel steering mechanism is operatively associated with the steering lever and provided with a pair of sliders and a synchronizing shaft. The sliders are coupled to each other by the synchronizing shaft and inclined at a certain angle forward inwardly when the front wheels are aligned longitudinally. Each slider extends from an engaging member, which can be separated from the pivotal shaft of the front wheel. The reversing mechanism couples the front wheel steering mechanism to the pivotal shafts of the rear wheels. The steering mode switching mechanism operates to switch operation between a mode in which both the front and rear wheels are steered and a mode in which the front wheels are freely pivotable and the front wheels are fixedly aligned longitudinally. To achieve the latter mode, the steering mode switching mechanism disengages the engaging members from the pivotal shafts of the front wheels.

According to a second aspect of the present invention, the steering mode switching carriage may further include a traction bar tiltably coupled to a front end of the steering lever to operate the steering mode switching mechanism. In this case, when the traction bar is tilted forward, the engaging members engage the pivotal shafts of the front wheels to allow the front and rear wheels to be steered by the steering lever. On the other hand, when the traction bar is tilted into an upright position, the engaging members are disengaged from the pivotal shafts of the front wheels to make the front wheels unsteerable, while the steering lever is fixed at a central position thereof to fixedly align the rear wheels longitudinally.

According to a third aspect of the present invention, the reversing mechanism may be composed of two lateral parts, each part having two interlocking links, two slide links and two fixing links. The fixing links are substantially half as long as the slide links. In this case, each engaging member has a link lever extending therefrom, and each pivotal shaft of the rear wheel also has a link lever extending therefrom. In addition, with regard to each lateral part of the reversing mechanism, one end of each fixing link is coupled to a center of each slide link, the slide links are coupled to each other at one ends thereof while the fixing links are coupled to each other at the other ends thereof, the slide links and the fixing links are pivotally supported on a bottom surface of the carriage to form a rhombus extending laterally, and the other ends of the slide links are coupled to the front and rear link levers respectively.

According to a fourth aspect of the present invention, the steering mode switching carriage may further include a pair of sliders each extending from the pivotal shaft of the rear wheel, a synchronizing shaft coupling the sliders of the rear wheels to each other, a rear wheel steering member, a front pivotal lever extending laterally from the steering lever and a rear pivotal lever extending laterally from the pivotally supported portion of the rear wheel steering member. In this case, the sliders are inclined at a certain angle rearward inwardly when the rear wheels are aligned longitudinally. One end of the rear wheel steering member is pivotally supported at a lateral center between the rear wheels, whereas the other end of the rear steering member engages a central portion of the synchronizing shaft. Furthermore, the reversing mechanism may include a pair of X-shaped links and a pair of interlocking links. In this case, the X-shaped links cross at and are horizontally pivotable about a center of a line connecting end portions of the front and rear pivotal levers with each other. The interlocking links couple ends of the X-shaped links to the end portions of the front and rear pivotal levers respectively. The reversing mechanism is thereby arranged symmetrically in the longitudinal direction of the carriage with respect to the aforementioned center of the line.

BRIEF DESCRIPTION OF THE DRAWINGS

FIGS. 5a and 5b are sectional views for explaining the steering mode switching mechanism shown in FIG. 4, in which FIG. 5a shows a case where the four wheels are steered in traction mode whereas FIG. 5b shows a case where the carriage is used as a cart.

DETAILED DESCRIPTION OF PREFERRED EMBODIMENTS

Hereinafter, preferred embodiments of the present invention will be described in detail with reference to the accompanying drawings.

Figure 1:
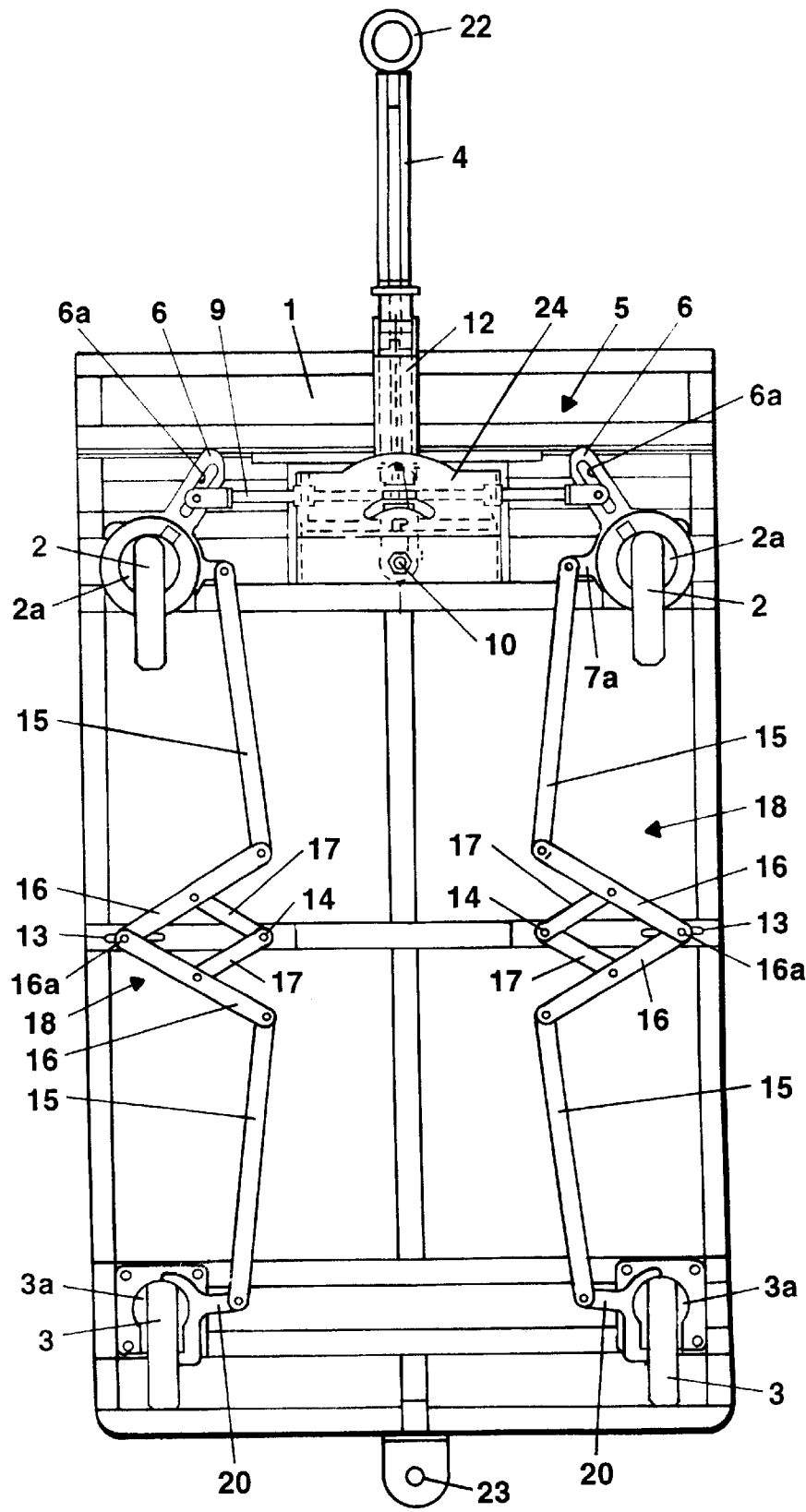
FIG. 1 is a bottom view of a steering mode switching carriage
   according to a first embodiment of the present invention.
Figure 2:
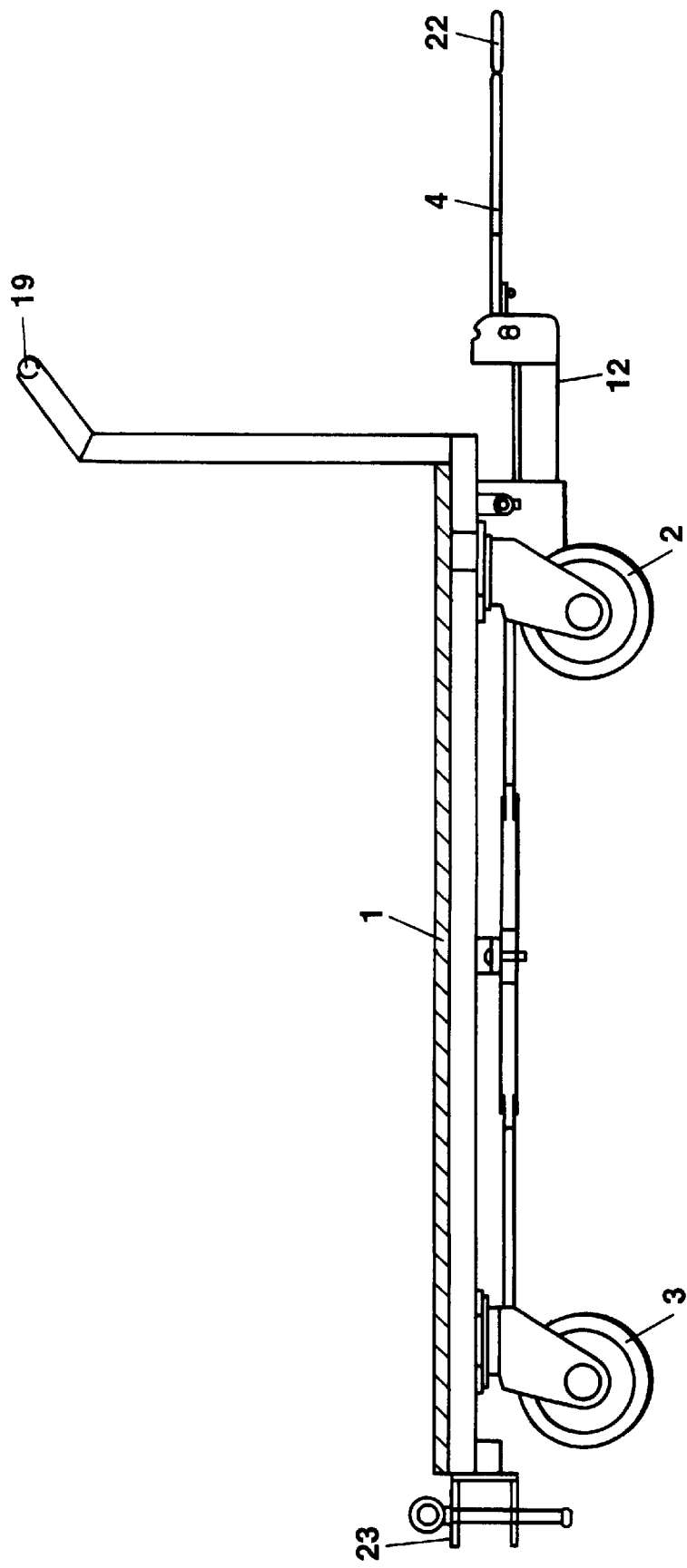
FIG. 2 is a side view of the carriage shown in FIG. 1.
Figure 3:
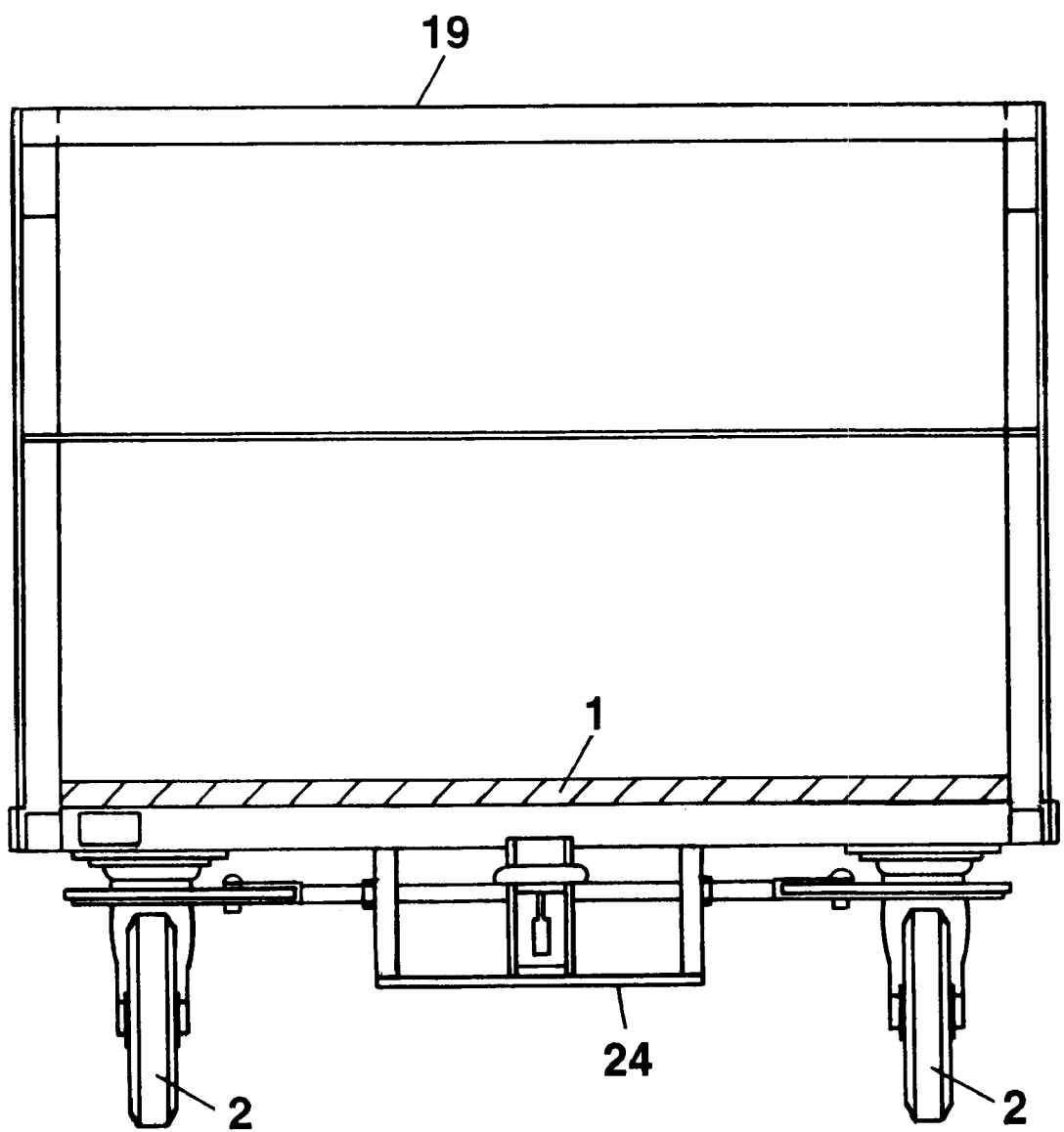
FIG. 3 is a front view of the carriage shown in FIG. 1.

As shown in FIGS. 1 and 2, a pair of horizontally pivotable front wheels 2, 2 and a pair of rear wheels 3, 3 are respectively mounted at four corners of a lower surface of a base plate 1, on which baggage is placed. Each front wheel 2 has a pivotal shaft 2a, while each rear wheel 3a has a pivotal shaft 3a. The pivotal shaft 2a is provided with a slider 6 for causing the wheel to pivot laterally. The right and left sliders 6 are coupled to each other by a synchronizing shaft 9. The synchronizing shaft 9 is partially accommodated in a housing 24 such that it can move laterally in synchronism with the lateral pivotal movement about a pivotal shaft 10 of a steering lever 12, which determines the traveling direction of the front wheels 2.

The pivotal shafts 2a, 3a are respectively provided with link levers 7a, 20 extending therefrom. The right link levers 7a, 20 are coupled to each other by a reversing mechanism 18, which includes two interlocking links 15, two slide links 16 and two fixing links 17. The left link levers 7a, 20 are also coupled to each other in the same way.

A front end of the steering lever 12 is connected to a traction bar 4, which has a coupler 22 to be coupled with a preceding carriage. As shown in FIG. 2, the carriage is provided with a handle 19 for the case where the carriage is used as a cart. Furthermore, the carriage has a coupler 23 to be coupled with a following carriage. It is to be noted in FIG. 1, that the front part of the carriage corresponds to an upper portion of the figure, whereas the rear part to a lower portion of the same.

The reversing mechanism 18 extends generally in the longitudinal direction of the carriage between the front and rear wheels 2, 3 and is formed symmetrically with respect to a center thereof. The front and rear wheels 2, 3 are caused to pivot by an angle in laterally opposed directions by the reversing mechanism 18. The interlocking links 15 extend from the link levers 7a, 20 of the front and rear wheels 2, 3 respectively, each being coupled to a front end of one slide link 16. The slide links 16, 16 are arranged in the shape of V and provided substantially around the center of the carriage. Rear ends of the slide links 16, 16 are coupled to each other by a coupling shaft 16a. A pair of laterally extending slots 13, 13 are formed through the base plate 1 on both sides thereof. The coupling shaft 16a is able to move loosely and slidably within one of the slots 13, 13.

As shown in FIG. 1, on one side of the carriage, a front end of each fixing link 17 is coupled to a central portion of the slide link 16. Although two fixing links 17,17 are arranged also in the shape of V, the slide links 16, 16 and the fixing links 17, 17 are arranged in mutually inverted relationship. On the other hand, rear ends of the two fixing links 17, 17 are coupled to each other by a link shaft 14 and thereby supported on the base plate 1. The slots 13, 13 and the link shafts 14, 14 are laterally aligned and located substantially at the longitudinal center between the front and rear wheels 2, 3.

Figure 4:
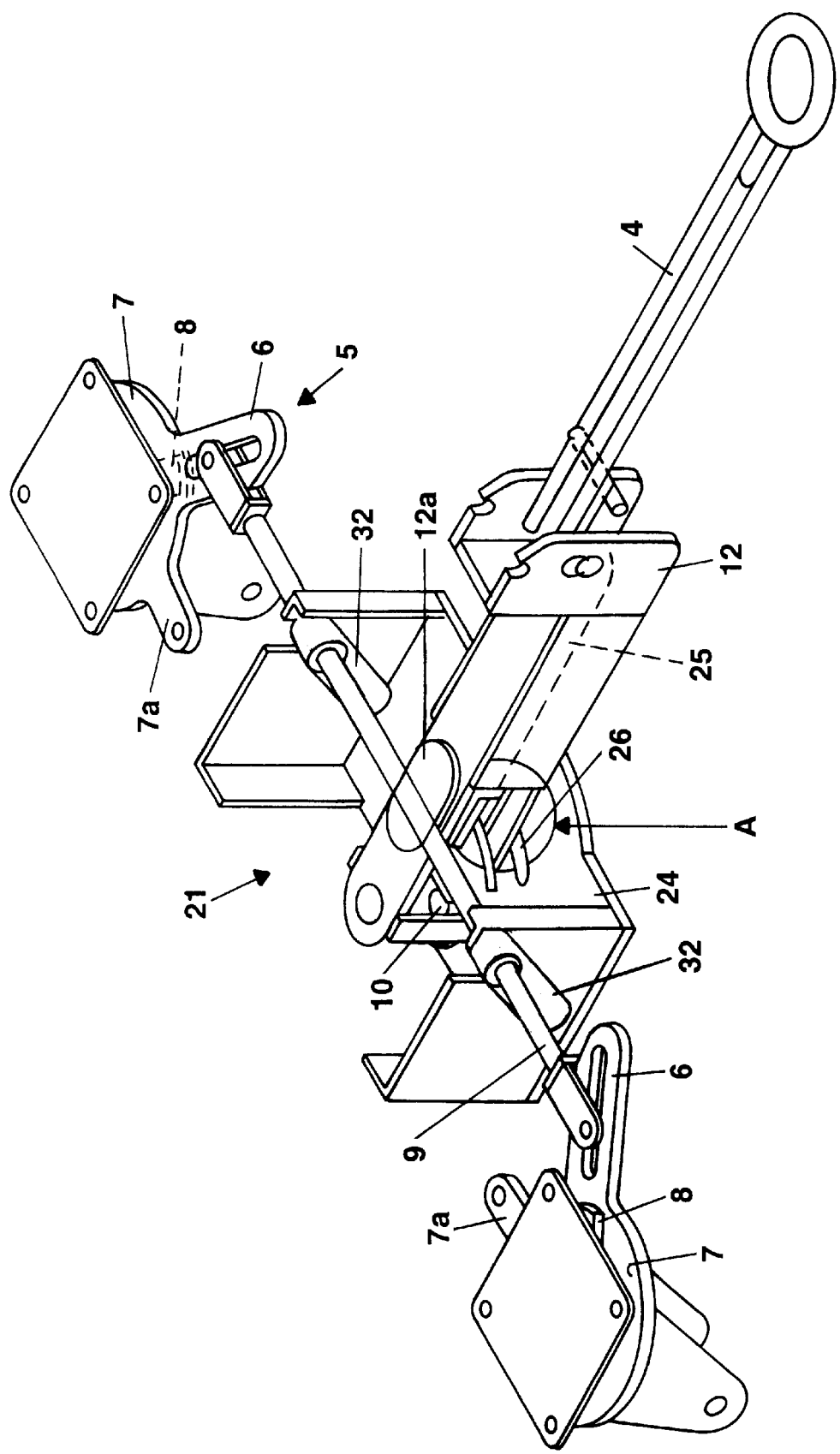
FIG. 4 is a perspective view of a front wheel steering mechanism and a steering mode switching mechanism shown in FIG. 1.

Referring now to FIGS. 4 and 5, a front steering mechanism 5 and a steering mode switching mechanism 21 will be explained.

A connecting protrusion 9a is formed on the central portion of the synchronizing shaft 9 and is loosely fitted in a slot 12a, which is formed through an upper surface of the steering lever 12. The synchronizing shaft 9 thus is adapted to move laterally in synchronism with the lateral pivotal movement of the steering lever 12. Each slider 6 is provided with a slot 6a, to which each end of the synchronizing shaft 9a is loosely coupled. The sliders 16, 16 are inclined such that they are gradually spaced apart from each other in the fore-to-aft direction of the carriage, based on the principle of mechanical structure.

Due to the front wheel steering mechanism 5 constructed as described above, the rear wheels 3, 3 are caused to pivot in synchronism with the front wheels 2, 2 by the reversing mechanism 18, allowing the carriage to travel smoothly on a curve without developing any discrepancy in turning radius between the front and rear inner wheels 2, 3.

Figure 6:
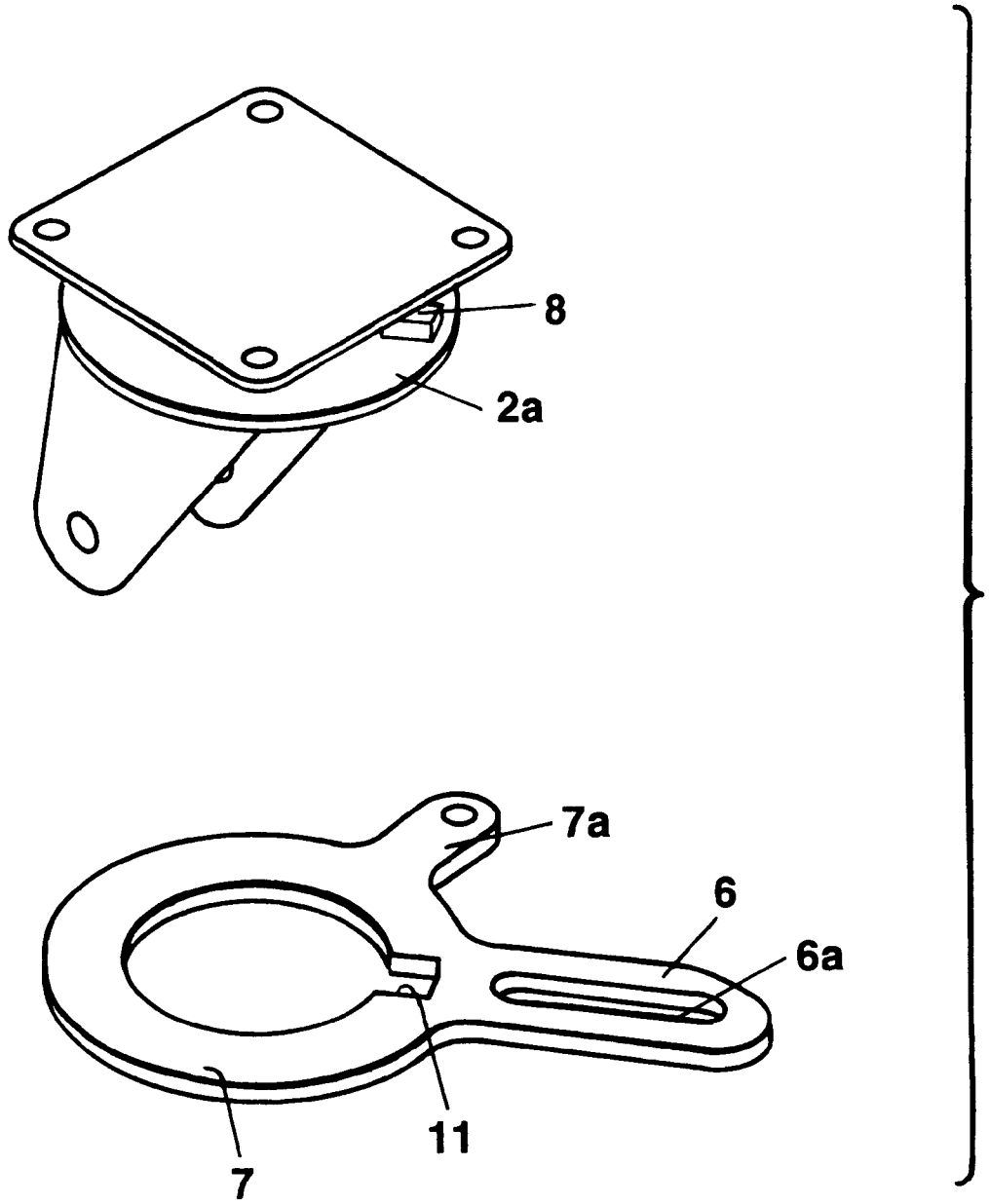
FIG. 6 is a diagram for explaining a pivotal portion of the front wheels in which a pivotal shaft and an engaging member having a slider and a link lever are separately shown.

As shown in FIG. 6, the slider 6 and the link lever 7a are formed integrally with an engaging member 7, which is separated from the pivotal shaft 2a of the front wheel 2. An engaging protrusion 8, which is laid on an upper surface of the pivotal shaft 2a, engages an engaging recess 11 formed through the engaging member 7, thus allowing pivotal movement of a corresponding front wheel 2 by the slider 6. The engaging member 7 is movable upward, and is disengaged when lifted by more than a thickness of the engaging protrusion 8.

Figure 5A:
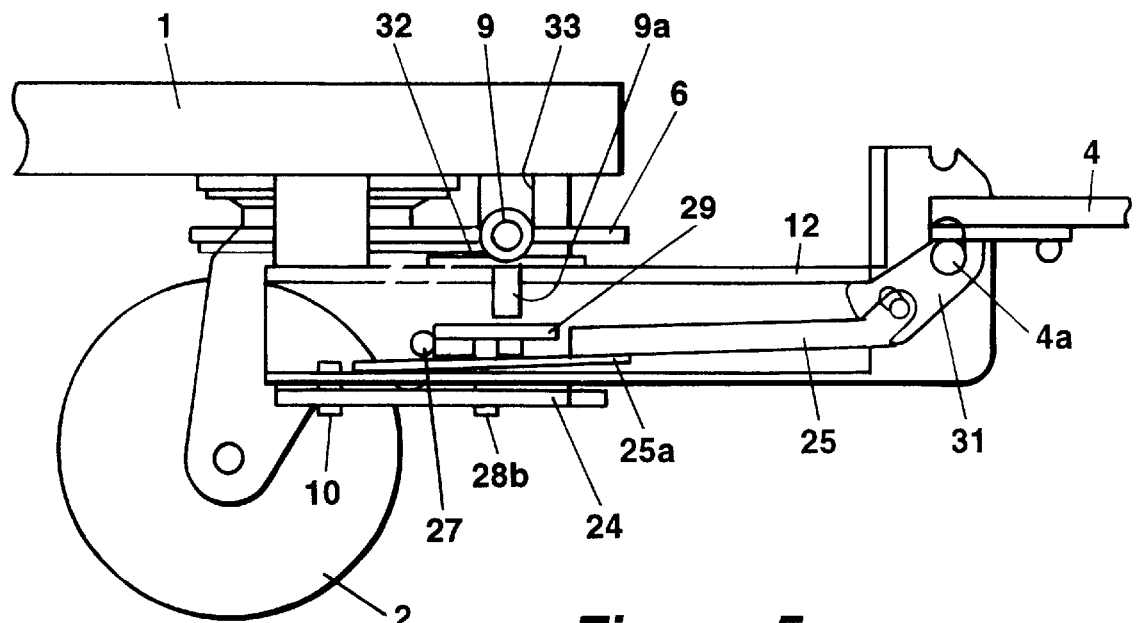
Figure 5B:
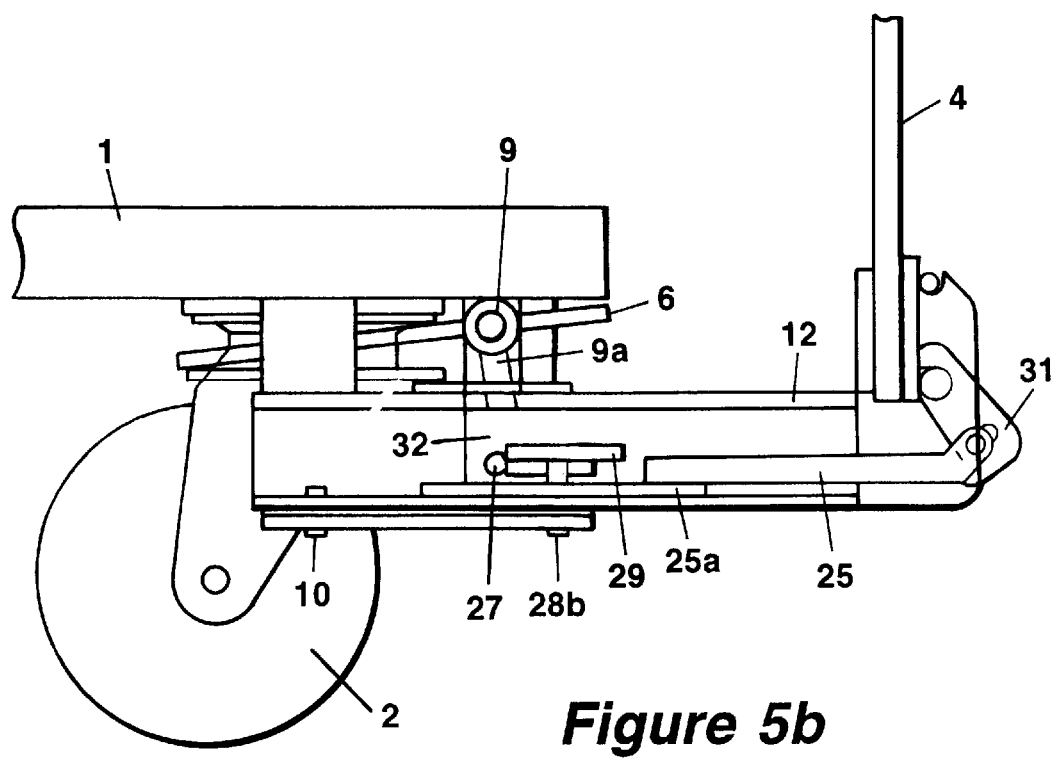

As shown in FIGS. 5(a) and 5(b), the essential parts of the steering mode switching mechanism 21 are accommodated in a housing 24. The pivotal shaft 10 for supporting the rear end of the steering lever 12 is mounted on a rear portion of a lower surface of the housing 24 at a center between the front wheels 2, 2. The steering lever 12 extends forward from the pivotal shaft 10. The steering lever 12 accommodates therein a switching plate 25a, which is welded to a switching bar 25 and therefore formed integrally therewith. A front end of the switching bar 25 is coupled to a coupling cam 31, which is fixedly formed on a pivotal shaft of the traction bar 4. The traction bar 4 is provided at the front end of the steering lever 12.

Figure 7:
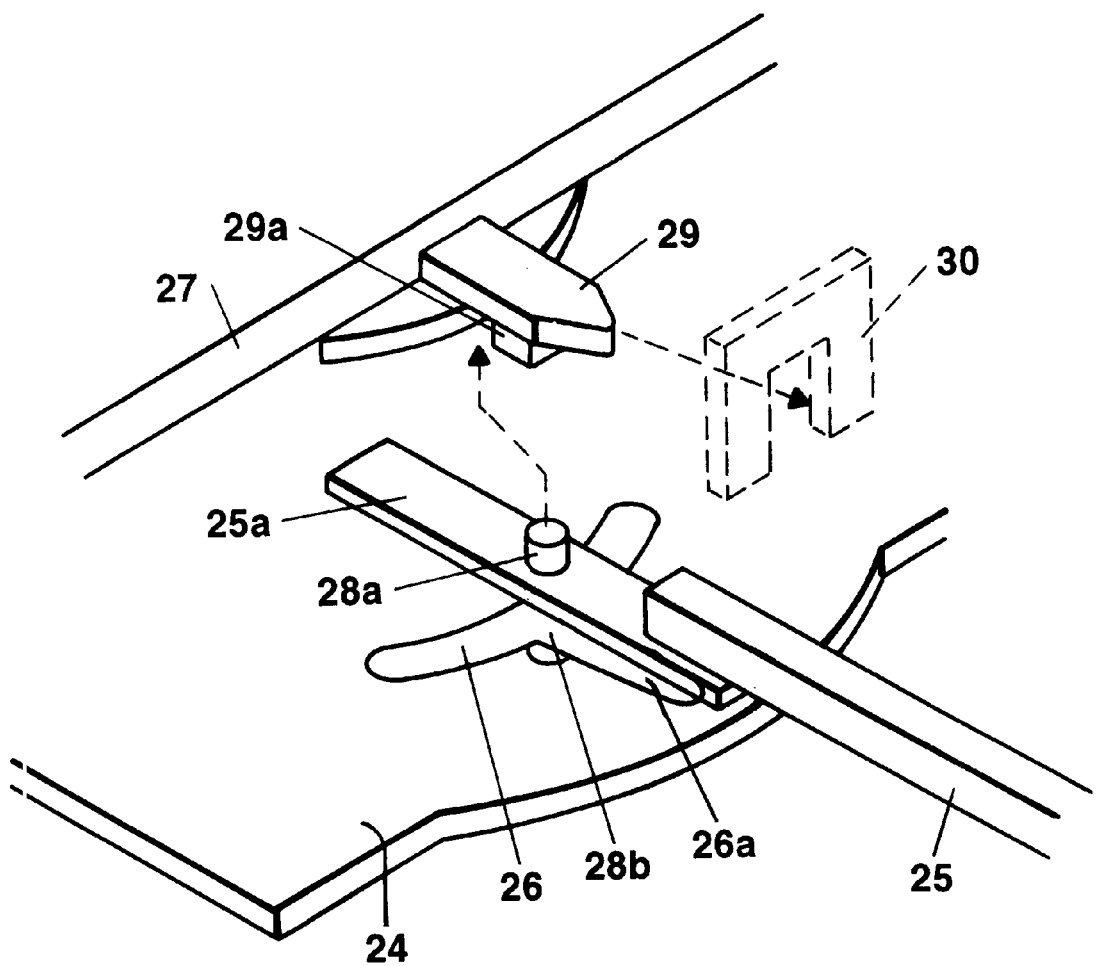
FIG. 7 is a enlarged view of section A shown in FIG. 4.

As shown in FIG. 7, a guide protrusion 28b for guiding and restricting the movement of the steering lever 12 is formed on a lower surface of the switching plate 25a substantially at a center thereof. On an upper surface of the switching plate 25a, there is formed an engaging protrusion 28a for causing a slide bar 27 to move. The housing 24 has on a lower surface thereof a substantially T-shaped guide slot 26, through which the guide protrusion 28b is guided. Furthermore, there is a fixing protrusion 29 formed at a center of the slide bar 27. When the slide bar 27 moves forward beyond a certain distance, the fixing protrusion 29 prevents the slide bar 27 from further moving forward.

The fixing protrusion 29 has on a lower surface thereof an engaging member 29a. Also, there is provided inside the steering lever 12 an engaging member 30, which engages the fixing protrusion 29 when the slide bar 27 moves forward beyond a certain distance.

The slide bar 27 and the synchronizing shaft 9 are coupled to each other by means of a pair of couplers 32, 32. That is, on one lateral side of the carriage, an end of the slide bar 27 is supported on one end portion of the coupler 32, while an end of the synchronizing shaft 9 is passed through the other end portion of the coupler 32 and thereby supported by the coupler 32. As shown in FIG. 5(a), the housing 24 has a vertically extending groove 33 formed on each lateral side thereof. The groove 33 is located substantially in an upper portion of the housing 24. The synchronizing shaft 9 is movable within the groove 33.

Hereinafter, the steering operation and the mode switching operation will be explained. When the carriage is used in traction mode, as shown in FIG. 5*a*, the traction bar 4 is tilted forward to be coupled to a preceding carriage or a tractor (not shown), so that the steering lever 12 is able to pivot laterally in accordance with the direction in which the preceding carriage travels. Then, in response to the lateral pivotal movement of the steering lever 12, the synchronizing shaft 9 is caused to pivot laterally through the connecting protrusion 9*a*. As a result, the front wheels 2, 2 are also caused to pivot laterally through the sliders 6, 6. On the other hand, the rear wheels 3, 3 are caused to pivot in the direction opposite to the pivotal movement of the front wheels 2,2 due to the reversing mechanism 18.

When the carriage is used as a cart, as shown in FIG. 5(*b*), the steering lever 12 is fixed at a central position so that the carriage can travel in the straight direction, and the traction bar 4 is raised upward to reach an upright position. In this raising operation, a coupling cam 31 connected with the traction bar 4 causes the switching bar 25 and the switching plate 25*a* to move forward. Then, the guide protrusion 28*b* formed on the lower surface of the switching plate 25*a* is introduced into a central longitudinal groove 26*a*, which constitutes part of the T-shaped guide slot 26*a* of the housing 24. The steering lever 12 is thus fixed at the central position thereof without being caused to pivot laterally.

At the same time, the engaging protrusion 28*a* formed on the upper surface of the switching plate 25*a* engages the engaging member 29*a*, thereby causing the slide bar 27 to move forward. Furthermore, the synchronizing shaft 9 is also caused to move by the couplers 32, 32. Since the synchronizing shaft 9 is passed through the vertically extending grooves 33, 33, it is able to move only in the vertical direction.

Then, the sliders 6, 6 connected to the ends of the synchronizing shaft 9 are lifted, and the engaging protrusions 8, 8 of the pivotal shafts 2*a*, 2*a* are disengaged from the engaging recesses 11, 11 of the sliders 6, 6, thereby allowing pivotal movement of the front wheels 2,2. Since the steering lever 12 is fixed at the central position thereof, the front wheel steering mechanism 5 is fixed at a position corresponding to the straight movement of the carriage. As a result, the rear wheels 3,3 are fixed such that they can travel only in the straight direction. Thus, the carriage can be used in the same way as a conventional cart.

Hereinafter, a second embodiment of the present invention will be described with reference to FIG. 8. This embodiment is different from the first embodiment only in the construction of a reversing mechanism for symmetrically operating the front wheels 2, 2 and the rear wheels 3, 3. Accordingly, the following descriptions will be limited to the reversing mechanism, without referring to the other components in any further detail.

Figure 8:
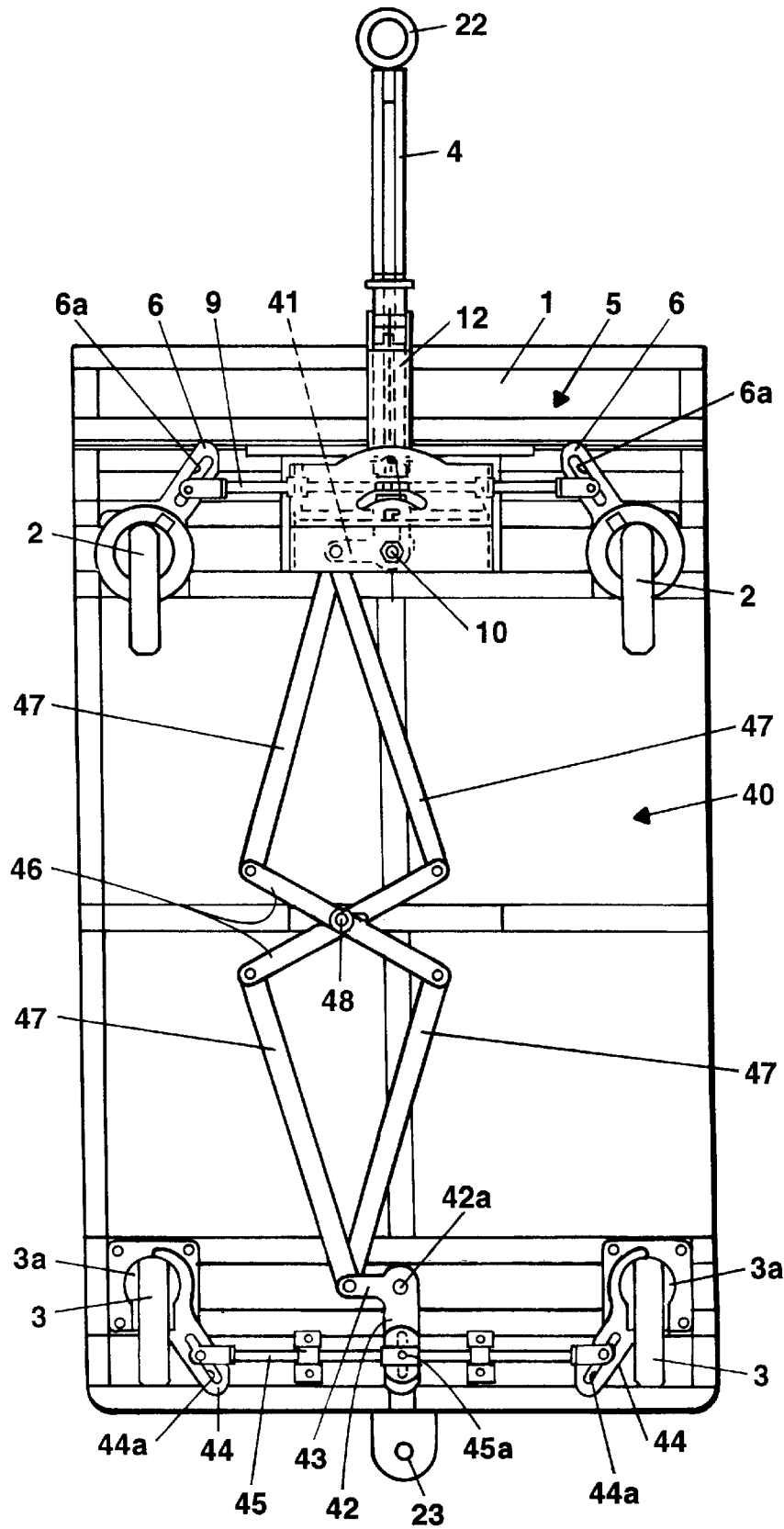
FIG. 8 is a bottom view of a steering mode switching carriage according to a second embodiment of the present invention.

As shown in FIG. 8, the carriage is provided with a reversing mechanism 40, which extends substantially in the longitudinal direction of the carriage and are located substantially at a lateral center thereof. As in the first embodiment, the pivotal shafts 3*a*, 3*a* are each provided with a slider 44, which has a slot formed therethrough. The sliders 44, 44 are inclined at an angle such that they are gradually spaced apart from each other in the aft-to-fore direction of the carriage. Both the sliders 44, 44 are coupled to each other through a synchronizing shaft 45.

Furthermore, there is provided on the bottom surface of the base plate 1 a pivotal shaft 42*a* for pivotally supporting a front end of a steering member 42, which extends longitudinally. The pivotal shaft 24*a* is located at the lateral center between the rear wheels 3, 3. A rear end of the steering member 42 is coupled to the central portion 4*a* of the synchronizing shaft 45. The pivotal shaft 42*a* has a pivotal lever 43 extending laterally therefrom. The pivotal lever 43 is coupled via the reversing mechanism 40 to a pivotal lever 41, which extends laterally from a pivotal shaft of the steering lever 12.

The reversing mechanism 40 includes two crossed links 46, 46 and four interlocking links 47, 47, 47, 47, one end of each interlocking link 47 being connected to a corresponding end of the crossed links 46, 46. The links 46, 46 are supported at the center thereof by a link shaft 48, which is formed on the base plate 1. Two of the other ends of the front interlocking links 47, 47 are connected to the pivotal lever 41, whereas the other two ends of the rear interlocking links 47, 47 are connected to the pivotal lever 43. Thus, the front interlocking links 47, 47 and the rear interlocking links 47, 47 are arranged symmetrically in the longitudinal direction of the carriage.

The link shaft 48 is designed to move slightly laterally to allow the reversing mechanism 40 to move smoothly.

With the reversing mechanism constructed as described above according to the second embodiment, substantially the same advantage as of the first embodiment is obtained. That is, when the carriage is used in traction mode, the rear wheels follow the traces of the front wheels, thereby eliminating any discrepancy in turning radius between the front and rear inner wheels. When the carriage is used as a cart, on the other hand, the rear wheels are fixed without being allowed to pivot laterally, while the front wheels are freely pivotable.

Although the construction of the steering mode switching mechanism and the reversing mechanism has been described based on the first and second embodiments, they may be constructed otherwise.

It is thus understood from the foregoing descriptions that the steering mode switching carriage according to the present invention is very convenient. That is, when the carriage is used in traction mode, traveling on a curve does not develop any discrepancy in turning radius between the front and rear inner wheels. When a plurality of carriages are coupled to each other, each being driven by the preceding carriage through the steering lever, they travel on a single path without deviating therefrom. When the carriage is used as a cart, on the other hand, the front wheels are freely pivotable and the rear wheels are fixedly aligned longitudinally.

While the present invention has been described with reference to what is presently considered to be preferred embodiments thereof, it is to be understood that the invention is not limited to the disclosed embodiment or construction. To the contrary, the present invention is intended to cover various modifications and equivalent arrangements included within the spirit and scope of the appended claims.

The entire disclosure of Japanese Patent Application No. 9-8894 filed on Jan. 21, 1997 including specification, drawings, and abstract is incorporated herein by reference in its entirety,

What is claimed is:

1. A steering mode switching carriage comprising:
   a pair of front wheels each having a pivotal shaft;
   a pair of rear wheels each having a pivotal shaft;
   a steering lever whose rear end is pivotally supported at a lateral center position between the front wheels;

a front wheel steering mechanism operatively associated with the steering lever and having a pair of sliders and a synchronizing shaft, said sliders being coupled to each other by said synchronizing shaft and being inclined at a certain angle forward inwardly when the front wheels are aligned longitudinally, each of said sliders extending from an engaging member which can be separated from the pivotal shaft of the front wheel;

a reversing mechanism coupling the front wheel steering mechanism to the pivotal shafts of the rear wheels; and a steering mode switching mechanism for switching operation between a mode in which both the front and rear wheels are steered and a mode in which the front wheels are freely pivotable and the rear wheels are fixedly aligned longitudinally, said steering mode switching mechanism achieving the latter mode by disengaging the engaging members from the pivotal shafts of the front wheels.

2. The steering mode switching carriage according to claim 1, further comprising a traction bar tiltably coupled to a front end of said steering lever to operate said steering mode switching mechanism;

wherein when the traction bar is tilted forward, said engaging members engage the pivotal shafts of the front wheels to allow the front and rear wheels to be steered by the steering lever; and wherein when the traction bar is tilted into an upright position, the engaging members are disengaged from the pivotal shafts of the front wheels to make the front wheels unsteerable, while the steering lever is fixed at a central position thereof to fixedly align the rear wheels longitudinally.

3. The steering mode switching carriage according to claim 1, said reversing mechanism comprising two lateral parts each having two interlocking links, two slide links and two fixing links substantially half as long as said slide links;

said engaging members each having a link lever extending therefrom;

said pivotal shafts of the rear wheels each having a link lever extending therefrom;

wherein with regard to each lateral part of the reversing mechanism, one end of each fixing link is coupled to a center of each slide link, the slide links are coupled to each other at one ends thereof while the fixing links are coupled to each other at the other ends thereof, the slide links and the fixing links are pivotally supported on a bottom surface of the carriage to form a rhombus extending laterally, and the other ends of the slide links are coupled to the front and rear link levers respectively.

4. The steering mode switching carriage according to claim 1, further comprising:

a pair of sliders each extending from the pivotal shaft of the rear wheel, said sliders being inclined at a certain angle rearward inwardly when the rear wheels are aligned longitudinally;

a synchronizing shaft coupling the sliders of the rear wheels to each other;

a rear wheel steering member whose one end is pivotally supported at a lateral center between the rear wheels, the other end of said rear steering member engaging a central portion of said synchronizing shaft;

a front pivotal lever extending laterally from said steering lever;

a rear pivotal lever extending laterally from the pivotally supported portion of the rear wheel steering member;

said reversing mechanism comprising a pair of X-shaped links and a pair of interlocking links;

wherein said X-shaped links cross at and are horizontally pivotable about a center of a line connecting end portions of the front and rear pivotal levers with each other;

wherein said interlocking links couple ends of the X-shaped links to the end portions of the front and rear pivotal levers respectively; and wherein said reversing mechanism is thereby arranged symmetrically in the longitudinal direction of the carriage with respect to said center of the line.

* * * * *